United States Patent Office 3,634,383
Patented Jan. 11, 1972

3,634,383
METHOD OF FORMING DIFUNCTIONAL POLYISOBUTYLENE
Joseph A. Miller, Jr., Newark, Del., assignor to the United States of America as represented by the Administrator of the National Aeronautics and Space Administration
No Drawing. Filed July 28, 1969, Ser. No. 845,584
Int. Cl. C08f 3/14
U.S. Cl. 260—94.8                                5 Claims

ABSTRACT OF THE DISCLOSURE

Isobutylene is polymerized to a difunctional polymer having an unsaturated group at each end thereof by contacting the isobutylene with a molecular sieve for a period of time sufficient to achieve the polymerization.

ORIGIN OF THE INVENTION

The invention described herein was made by an employee of the United States Government and may be manufactured and used by or for the government for governmental purposes without the payment of any royalties thereon or therefor.

BACKGROUND OF THE INVENTION

(1) Field of the invention

The invention generally relates to the field of polymerization and more particularly relates to a method for polymerizing isobutylene.

(2) Description of the prior art

Polyisobutylene perhaps has the best properties of any polymer material for utilization as a solid propellant binder. In order for it to be used as a binder, it must be capable of being chain extended. A normal polymer of isobutylene, however, is monofunctional, having a double bond at only one end of the polymer chain. In order to provide a difunctional isobutylene, the previously developed approach has involved reacting isobutylene with butadiene to obtain a copolymer that is often referred to as butyl rubber. The butyl rubber is then subjected to an ozonolysis to split it and give difunctional compounds. Thus, as can be appreciated, this prior technique is a complex procedure, being time consuming and costly. Further, the molecular weight of the difunctional polymer product is controlled by the amount of butadiene inculcated in the butyl rubber backbone. Since the level of butadiene incorporation is limited, the molecular weight range of difunctional polymers produced is quite narrow.

OBJECTS AND SUMMARY OF THE INVENTION

An object of this invention is to provide an extremely easy straightforward approach to providing difunctional polyisobutylene.

Another object of this invention is to provide a method for providing difunctional polyisobutylene wherein the molecular weight of the product can be controlled.

A still further object of the invention is to provide a method for forming high molecular weight difunctional polyisobutylene.

The above and other objects are accomplished by the method of the herein invention which comprises contacting isobutylene with a molecular sieve to achieve the polymerization. The reaction is carried out in the liquid phase by condensing isobutylene into a vessel containing the molecular sieve. The reaction can be carried out, for example, at ambient temperature and autogenous pressure for varying periods of time. As the reaction period increases, or temperature is lowered, the molecular weight of the resulting polyisobutylene and polymerization efficiency tend to increase. Additionally, if the material is stirred during the reaction period the molecular weight will tend to increase. At completion of the reaction period, the formed product is removed from the molecular sieve by a suitable hydrocarbon solvent and then separated from the solvent. It has been found that the results of the herein invention are particularly obtainable through the utilization of a 5-Angstrom molecular sieve.

DESCRIPTION OF THE PREFERRED EMBODIMENT

It should be pointed out prior to a further discussion of the invention that others have utilized an approach quite similar to the herein disclosed method, yet obtained entirley different results. Others have contacted monomers, including isobutylene, with molecular sieves. However, in these prior instances gaseous isobutylene was contacted. In some instances polymerization was not achieved. The polyisobutylene there formed from a gaseous phase contact was not determined to be difunctional and did not have a high molecular weight.

The normal polymerization of isobutylene is accomplished by contacting diluted isobutylene in the liquid or vapor phase with strong Lewis acids, i.e., titanium tetrachloride, aluminum trichloride, and borontrifluoride, in the presence of minute quantities of water.

The following reaction I depicts this method:

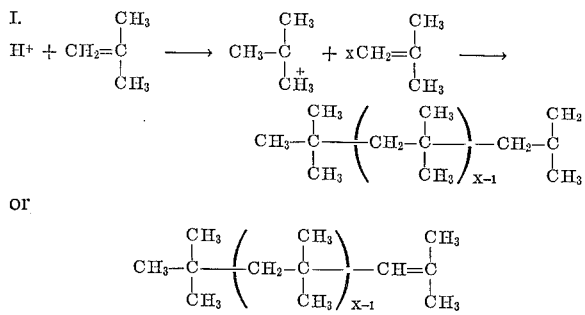

or

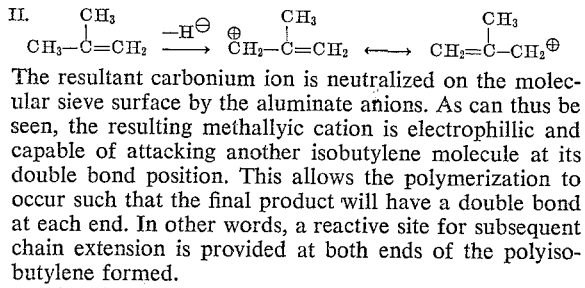

As can be seen, the resulting polyisobutylene has only one functional terminal group.

In the herein invention utilizing a 5-Angstrom molecular sieve, such as a Linde molecular sieve type 5A made by Union Carbide Corporation, it is hypothesized that the molecular sieve effects a hydride ion abstraction from the isobutylene.

Hydride removal is believed to be accomplished by strong dipolar forces created between the incompletely neutralized calcium and aluminate ions of the molecular sieve in accord with the following reaction II:

II. $$CH_3-\overset{CH_3}{\underset{|}{C}}=CH_2 \xrightarrow{-H^{\ominus}} \overset{CH_3}{\underset{|}{\overset{\oplus}{C}H_2}}-\overset{}{C}=CH_2 \longleftrightarrow CH_2=\overset{CH_3}{\underset{|}{C}}-CH_2^{\oplus}$$

The resultant carbonium ion is neutralized on the molecular sieve surface by the aluminate anions. As can thus be seen, the resulting methallyic cation is electrophillic and capable of attacking another isobutylene molecule at its double bond position. This allows the polymerization to occur such that the final product will have a double bond at each end. In other words, a reactive site for subsequent chain extension is provided at both ends of the polyisobutylene formed.

It is pointed out that the aforegoing effect utilizing a 5–A molecular sieve cannot be achieved, for example, with a 4-angstrom or 13× molecular sieve which does not have the Ca++ present.

In carrying out the method of the herein invention, a preweighed quantity of 5–A molecular sieve is placed in a suitable reaction vessel, such as a round bottom flask. The flask with the molecular sieve is then connected to a vacuum system and the sieve is heated and evacuated to a vacuum on the order of $10^{-6}$ mm. of mercury. The specific vacuum conditions are not critical. However, they should be sufficient to withdraw any moisture that might be present in the sieve. The sieve is then cooled to a temperature below the freezing point of isobutylene, which is $-140.3°$ C. This can be simply accomplished by surrounding the reaction vessel with a bath of liquid nitrogen which would then lower the temperature of the sieve to $-196°$ C. While the molecular sieve is at the low temperature, isobutylene is condensed from a calibrated tube into the reaction vessel onto the sieve. The amount of sieve or isobutylene is not critical. If there is an excess of sieve, then the isobutylene will react until all the material is polymerized. If there is an excess of isobutylene then only so much of it will polymerize as there are "active sites" present on the sieve.

After condensation of the isobutylene, the frozen mixture is degassed. The initial vacuum conditions utilized can be repeated. This degassing serves to remove non-condensable impurities that were present in the isobutylene, if any.

After the non-condensable impurities are removed, the flask is sealed and removed from the vacuum line and rapidly warmed preferably to room temperature. This can be accomplished using a flameless heat torch or any other suitable means. During the reaction that transpires at room temperature, the autogenous pressure developed is about 1.75 atmospheres. It is preferred to continuously stir the mixture in the reaction vessel during the entire reaction period. However, stirring is not a mandatory requirement. It has been found that by stirring there appears to be a definite increase in the molecular weight achieved in the final end polyisobutylene product. The length of reaction depends upon the desired molecular weight.

As the reaction period increases, or the temperature is lowered, the molecular weight as has been indicated can go from 1,000 to 4,000. The varying periods of time, for example, could vary from 16 hours up to 7 days. At the completion of the reaction, all lower-boiling fractions are distilled from the reaction vessel. The resulting mixture is then washed with a suitable low-boiling hydrocarbon solvent, such as pentane or the like. The solvent is removed from the molecular sieve (containing the polymer dissolved therein). This is followed by separating the solvent from the polymer, leaving the product of the invention. The number average molecular weight was determined by viscosity, gel permeation chromatography or other commonly used technique. Using this molecular weight the functionality of the polyisobutylene obtained in the foregoing method was determined by nuclear magnetic resonance proton integration techniques.

One advantage of the foregoing method is that it can be utilized in a continuous type process wherein the lower boiling fractions which are distilled from the molecular sieve at the end of the reaction can be recirculated to the molecular sieve. These lower boiling fractions will normally contain the non-polymerized isobutylene. Further, the molecular sieve is regenerative and can be used repeatedly in the process.

Since successful results are readily achieved at ambient temperature, no need is seen for raising the temperature of reaction. Alternatively, as will be seen, the reaction can also be carried out at 0° C., though this is not as preferred as a more ambient temperature condition. Thus a broad temperature range for the polymerization is $-141°$ C. to 35° C.

It is believed that the invention will be better understood from the following detailed examples:

EXAMPLE I

A 300 milliliter round bottom flask was filled with 23 grams of Linde 5A molecular sieve. The flask was then degassed by connecting it to an oil pump where the pressure was lowered to $10^{-4}$ mm. Hg for a period of two days. It was then heated intermittently to about 100° C. over a five hour period while evacuating the flask with a mercury diffusion pump to a pressure of about $10^{-6}$ mm. Hg. The flask was then placed in a liquid nitrogen bath and 75 ml. of reagent grade isobutylene was introduced into the flask. The isobutylene was then allowed to warm to room temperature. The reaction vessel was kept at room temperature for 24 hours. At the end of the 24-hour period excess isobutylene was distilled from the mixture. The molecular sieve was then washed with six 50 milliliters portions of pentane. The six washings were combined and the pentane evaporated at reduced pressure until polymer appeared. The polymer was finally dried under vacuum at 50° C. for three days. The number average molecular weight as determined by gel permeation chromatography was 1100. The functionality determined by NMR analysis was 1.8. The polymer's structure was determined by infrared and NMR spectroscopy to be of the normal head-to-tail type. Ozonolysis of the material formed in accord with the foregoing procedure of this example yielded a polymer having an average molecular weight of 1200, which is essentially within the experimental range of that found for the material indicated above. Thus, the ozonolysis indicated that there was no cleavage of the polymer and thus the functionality must be at both ends.

EXAMPLE II

Example I was repeated, utilizing the same amount of ingredients, and the same procedure, except that the reactants were stirred in the reaction vessel continuously for a 32-hour reaction period at room temperature. Stirring was accomplished by the utilization of a motor driven stirrer. The average molecular weight of the polyisobutylene obtained was 2020, indicating that through the use of stirring one can significantly increase the molecular weight of the polymer product. Efficiency was 18 percent.

EXAMPLE III

Twenty-five grams of a 5–A molecular sieve was placed in a 300 milliliter round bottom flask. The flask was then sealed onto a vacuum system and the sieve degassed at less than 1 micron pressure on an oil pump, and then was subjected to a pressure of $10^{-5}$ mm. Hg for 8 hours, during which the flask was heated to about 100° C. Sixty-two milliliters of isobutylene, which was obtained from the unreacted portion of Example II, together with 13 milliliters of reagent grade isobutylene were introduced into the sieve which was maintained at liquid nitrogen temperature during this portion of the process. The heterogenous mixture was then quickly warmed to 0° C. by an ice pack. The flask and contents were maintained at 0° C. and stirred at this temperature for a period of four days. The molecular sieve was washed with four 50 milliliter portions of pentane. The pentane was then removed under vacuum and the polymer dried under vacuum for three days. The resulting polyisobutylene had an average molecular weight of 3280 and a functionality of 2.1. The conversion of isobutylene was 37 percent to form the polymer product.

EXAMPLE IV

The procedure of Example I was repeated, utilizing 25 grams of a 5–A molecular sieve and 75 milliliters of reagent grade isobutylene. The reaction was conducted at room temperature for a period of 264 hours, or eleven days. During the reaction period there was continuous stirring of the material. The average molecular weight of the polyisobutylene formed was 3600 and the functionality was found to be 2.1. The conversion to the polymer was 30 percent. Once again, this example points out that through increasing the length of reaction time a higher molecular weight product is obtainable.

EXAMPLE V

Example I was repeated utilizing a 4–A molecular sieve. No polymer was formed. When the same example was repeated utilizing a 13× molecular sieve, no polymer was formed.

I claim:

1. A method of forming polyisobutylene having two terminal double bonds comprising:
   providing a 5A molecular sieve,
   contacting isobutylene with said sieve for a period of time sufficient to achieve said polymerization,
   and separating the formed polyisobutylene having two terminal double bonds formed from said sieve.

2. A method of forming polyisobutylene having two terminal double bonds according to claim 1 comprising:
   providing a reaction vessel containing a 5A molecular sieve,
   removing moisture from said sieve,
   cooling said vessel below the freezing point of isobutylene,
   condensing isobutylene into said cooled vessel, under vacuum conditions,
   sealing the vessel,
   heating the vessel to ambient temperature,
   maintaining said sieve and said isobutylene at ambient temperature for a period of time sufficient to cause said polymerization,
   washing said sieve with a solvent for polyisobutylene,
   and separating said polyisobutylene from said solvent.

3. The method of claim 1 further comprising:
   degassing the molecular sieve after condensation of said isobutylene therein to remove non-condensable impurities therefrom.

4. The method of claim 1 further comprising:
   stirring said sieve and isobutylene during the polymerization reaction.

5. Polyisobutylene having two terminal double bonds.

References Cited
UNITED STATES PATENTS

| | | | |
|---|---|---|---|
| 3,208,984 | 9/1965 | Dekking | 260—89.5 |
| 3,514,432 | 5/1970 | Burton | 260—85.3 |

JOSEPH L. SCHOFER, Primary Examiner

R. A. GAITHER, Assistant Examiner